Aug. 16, 1960  K. GEBELE  2,949,069
EXPOSURE VALUE SETTING MEANS WITH DETACHABLE OPTICAL UNIT
Filed Jan. 28, 1958  4 Sheets-Sheet 1

United States Patent Office 2,949,069
Patented Aug. 16, 1960

2,949,069
EXPOSURE VALUE SETTING MEANS WITH DETACHABLE OPTICAL UNIT

Kurt Gebele, Munich, Germany, assignor to Compur-Werk Friedrich Deckel OHG, Munich, Germany, a German firm Filed Jan. 28, 1958, Ser. No. 711,605

Claims priority, application Germany Jan. 29, 1957

4 Claims. (Cl. 95—10)

The present invention relates to photographic cameras, particularly still cameras, having a detachable and interchangeable optical unit containing either a shutter speed setting member or a diaphragm aperture setting member or both, and deals particularly with means arranged at least partly on the camera for setting the exposure value notwithstanding the detachable nature of the optical unit above mentioned.

An object of the invention is the provision of generally improved and more satisfactory mechanism of this kind.

Another object is the provision of setting means particularly adapted for a follow-up pointer associated with a light meter built into the camera body, and arranged to be operatively connected to the movable setting member or members on the detachable optical unit in a manner to insure satisfactory operation whenever the detachable unit is in place on the camera.

Still another object is the provision of setting means which is particularly simple and inexpensive to construct, sturdy and reliable in operation, and of sufficiently compact construction to enable it to be used on modern miniature cameras.

A further object is the provision of interlocking means preventing the detachment or replacement of the interchangeable optical unit except when the movable parts of the exposure value setting means are in a certain predetermined position or condition, or in one of a plurality of predetermined positions or conditions.

A further object is the provision, alternatively, of connecting means between the exposure value setting parts on the camera and the exposure value setting parts on the interchangeable optical unit, so designed that the interchangeable optical unit can be removed in any position of the setting means, and will automatically be restored to the proper set position when it is replaced on the camera.

A still further object is the provision of locking means preventing further adjusting movement of the exposure value setting parts on the camera and the exposure value setting parts on the interchangeable optical unit, so long as the unit is detached from the camera.

These and other desirable objects may be attained in the manner disclosed as an illustrative embodiment of the invention in the following description and in the accompanying drawings forming a part hereof, in which.

The same reference numerals throughout the several views indicate the same parts.

The invention is here described in connection with a still camera having a body 200, the camera being of known type and the details thereof being unimportant except as specifically mentioned herein. The camera has a film winding knob 202, a rewinding knob 204 for winding the exposed film back into the cassette, and a release plunger 206 constituting what is often called a "body release," that is, a movable member mounted directly on the camera body which serves to release or trip the shutter for making an exposure. Mounted on the front wall of the camera body is an annular bayonet ring 208, coaxially surrounding the optical axis and having bayonet flanges or lugs which mate with corresponding bayonet flanges or lugs on a bayonet mounting 212 which constitutes the rear part of a detachable and replaceable optical unit indicated in general at 210.

This interchangeable optical unit 210 contains at least part and preferably all of the lens; that is, at least one and preferably all of the components or elements which together make up the camera lens. It also contains either the objective shutter and its shutter speed control member, or the adjustable diaphragm and its diaphragm aperture control member, and preferably contains both the shutter and the diaphragm. The details of the internal arrangement of the interchangeable unit 210, except as specifically mentioned herein, are not important for purposes of the present invention, and may be of any conventional or known construction, since the present invention relates to the operative connection between certain adjustable parts on the interchangeable optical unit, on the one hand, and certain adjustable parts on the camera body itself, on the other hand. The adjustable parts just mentioned are those which relate to setting the shutter speed and diaphragm aperture to the proper exposure value (sometimes called the total exposure value, or the integrated exposure value) which, in turn, depends on various factors such as the illumination of the object to be photographed, taking into account also (either directly or indirectly) the film speed or sensitivity, and the filter factor, if any.

The concept of setting a photographic camera in accordance with an exposure value which indicates a relationship between the shutter speed and the diaphragm aperture, independently of the absolute value of either the shutter speed or the diaphragm aperture, is fully disclosed in the copending patent application of Kurt Gebele, Serial No. 389,775, filed November 2, 1953 (now Patent 2,829,574, granted April 8, 1958), and has also become familiar to many photographers in recent years because of the use of the exposure value system in certain cameras now on the market. The following description of the present invention presupposes that the reader is familiar with the exposure value system, and no further explanation thereof will be attempted here.

As above stated, the construction of the interchangeable optical unit 210 can be of any suitable known form so far as the present invention is concerned, except for the details specifically mentioned herein. Thus it may include an objective shutter of known form, indicated in general at 18, the shutter having the usual front and rear lens tubes coaxial with the optical axis, for carrying the components or elements of the lens. The shutter contains the usual movable shutter blades 19, and the usual adjustable iris diaphragm leaves or blades 20. Mechanism of known form within the annular space between the outer cylindrical wall of the shutter and the front lens tube, operates the shutter blades 19 to open and close them to make an exposure, at a variable or adjustable time or speed controlled by a rotatable shutter speed setting ring 22 rotatable about the front lens tube and having cam portions which serve to control the functioning of the gear train retarding mechanism of the shutter so as to determine the shutter speed, the cam ring 22 corresponding in function and operation, for example, to the control cam portions of the ring 63 in Deckel and Geiger Patent 1,687,123, granted October 9, 1928.

Figure 1:
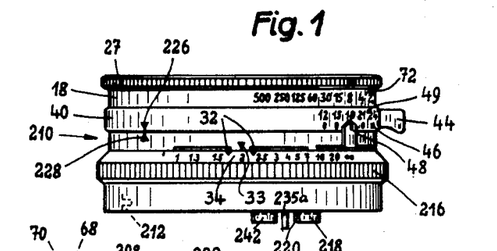
Fig. 1 is a top plan view of interchangeable optical unit including a shutter speed setting member and a diaphragm aperture setting member, showing it detached from the camera but alined with the camera in a position assumed when detaching it from or replacing it on the camera shown in Fig. 1A.
Figure 2:
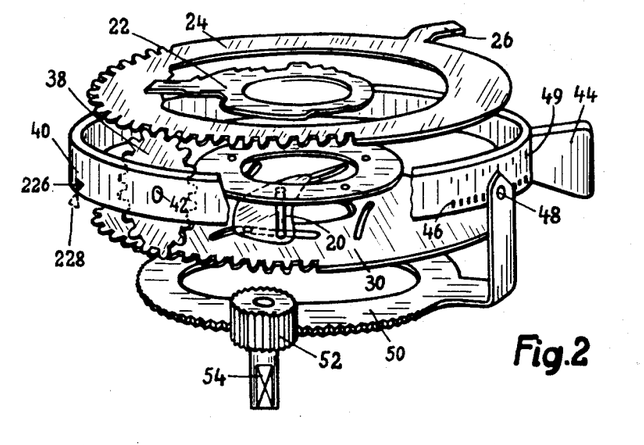
Fig. 2 is a perspective view of the differential gearing mechanism constituting part of the exposure value setting means built into the interchangeable optical unit.

The shutter speed control cam ring 22 is connected as by means of a radial arm to a gear ring 24 which rotates in the shutter coaxially with the ring 22 and the optical axis, and the gear ring 24 is connected by a radial arm 26 (Fig. 2) to an external shutter speed setting ring 27 (Figs. 1 and 3) which rotates around the exterior of the shutter substantially at the front end thereof and has a milled circumferential edge which may be manually grasped and turned to adjust the shutter speed to the desired amount. The speed for which the shutter is set for any given moment is read from a shutter speed scale 72 marked circumferentially on a fixed part of the periphery of the shutter, in conjunction with a reference mark on the manually adjustable ring 27. In Fig. 1, this reference mark is shown opposite the numeral "8" of the scale 72, thus indicating that the shutter is set for a speed of ⅛ of a second.

The iris diaphragm leaves or blades 20 are adjusted by turning the ring 30 which rotates coaxially with the optical axis, near the rear of the shutter 18. This ring 30 is preferably not connected directly to any externally accessible member, so that the diaphragm aperture cannot be set directly by hand, but can be set only in connection with the setting of the exposure value, as will be apparent below. Also, in the presently described embodiment of the invention, it is not necessary to provide any diaphragm aperture scale, because the size of the diaphragm aperture at any given moment is really of no importance to the photographer except as it affects the depth of field, and the present construction includes a depth of field indicator from which the depth of field can be read directly, thereby obviating the need for a diaphragm aperture scale. The depth of field is indicated by the pointers 32 (Fig. 1) which move toward and away from each other symmetrically with respect to the fixed reference point 33 marked on the shutter housing or other rotationally fixed part of the optical unit 210, the pointers 32 sweeping over a focus distance scale 34 marked on the focus adjusting ring 216 which turns coaxially with the optical axis. This focus distance scale 34 may be graduated in any suitable units of distance, such as feet or meters or yards. Graduations in terms of meters are shown in Fig. 1. For the sake of simplicity, the transmission means for driving the depth of field pointers 32 from the rotation of the diaphragm aperture adjusting ring 30 are not shown in the present application, but such transmission means may be constructed, for example, in the manner disclosed in the copending applications of Franz Singer, Serial No. 555,964, filed December 28, 1955, or Kurt Gebele, Serial No. 562,346, filed January 30, 1956.

Each of the rings 24 and 30 has gear teeth on parts of its periphery. Both sets of gear teeth mesh simultaneously with the gear teeth on opposite sides of a pinion 38 mounted to rotate on a pivot 42 on a ring 40 which is rotatable externally on the housing of the shutter, and which is provided with an external arm or finger piece 44 which may be grasped in order to turn the ring 40 to any desired position of adjustment relative to the rotationally fixed shutter housing. The pinion 38 thus constitutes a planet gear meshing with two sun gears 24 and 30, these gears together constituting a differential setting mechanism.

If the ring 40 is turned (either by the external finger piece 44, or by other means suitably connected to the ring 40) while one of the rings 24 and 30 is held stationary, the planet gear 38 will roll on the gear teeth of the stationary ring and will move the other one of the two rings 24 and 30. Preferably the ring 24 is releasably latched, or at least offers greater frictional resistance to turning than the ring 30, so that when the exposure value adjusting ring 40 is turned it will normally not change the previously set value of the shutter speed, but will change the exposure value by turning the ring 30 and altering the diaphragm aperture size. Equal movements of the rings 24 and 30 in opposite directions will change the shutter speed and diaphragm aperture in a complementary manner, without changing the exposure value, but any other movement of one ring relative to the other will result in a change in exposure value.

There is another ring 50 rotatable also about the optical axis as a center, located rearwardly of the ring 30 and operatively coupled in an adjustable manner to the ring 40, by means of a forwardly extending arm 48 on the ring 50, which engages in one or another of the notches or depressions 46 on the ring 40. The front end of the arm 48 constitutes a pointer, which can be adjusted to any desired position with respect to the film speed or film sensitivity scale 49 (Fig. 1) marked on the periphery of the ring 40. This constitutes what is sometimes called a zero point adjustment or reference mark adjustment of the exposure value setting means, in order to take care of variations in film speed or film sensitivity. In setting this adjustment, mental allowance can also be made for filter factor, by setting the arm at a point on the scale 49 corresponding to a film speed slower than that of the film actually being used, to take care of filter factor.

The ring 50 which carries the arm 48 is provided through part of its periphery with gear teeth which mesh with the teeth of a pinion 52 fixed to a shaft 54 rotatable in the main part of the interchangeable optical unit. This shaft 54 is operatively connected, as described below, to those parts of the exposure value adjusting means which are located on the camera body, and it is principally the connection of this shaft 54 to the parts on the camera body, together with associated controlling or latching parts, which constitutes the subject matter of the present invention. The parts 18 to 52 of the present invention may be constructed substantially the same, and may operate in substantially the same way, as the correspondingly numbered parts 18 to 52, respectively, of the copending patent application of Kurt Gebele and Franz Singer, filed January 8, 1958, Serial No. 707,796. Reference may be had to the application just mentioned for a more detailed description of this part of the construction, which is herein described only briefly.

It has already been mentioned that the interchangeable optical unit includes a bayonet mount 212 engageable with and disengageable from the bayonet mounting flanges 208 on the camera body. When the mount 212 is mounted in normal position on the camera body, it is stationary thereon. Therefore, to enable the shutter and lens portion of the assembly or unit to move axially forwardly and rearwardly for focusing, there is a tube 214 movable axially forwardly and rearwardly in the mount 212, but not rotatable with respect to the mount. The main portion of the interchangeable optical unit, including the shutter housing 18, is fixed to the forward end of the tube 214 to travel axially therewith. This axial travel is accomplished by rotation of the focusing ring 216, already briefly mentioned, which rotates on external screw threads on the bayonet mount member 212 and thus moves axially forwardly or rearwardly on the member 212 as it rotates, carrying the mount 214 and the main portion of the optical unit axially forwardly and rearwardly with it.

On account of this axial movement of the main portion of the optical unit with respect to the mounting portion 212, for focusing purposes, the pinion 52 is connected to the mechanism within the camera body by an axially telescopic connection. The shaft 54 of the pinion 52 is made of suitable non-circular cross section (e.g., one or more flat sides extending axially) which engage telescopically in a correspondingly shaped sleeve 218 mounted for rotation on the rear flange of the mount 212.

There are two principal kinds of bayonet connections suitable for use in mounting an optical unit detachably on a photographic camera body. In the first and most commonly used style of bayonet connection, one set of bayonet lugs is fixed to the camera body, the other set of bayonet lugs is fixed to the interchangeable unit, and the unit is attached to or detached from the camera body by a turning or twisting movement of the detachable unit relative to the camera body. This is the style of bayonet mounting used in conjunction with the structures of Figs. 1–7 of the present application. In the other principal style of bayonet mounting, one set of bayonet lugs is fixed to the detachable unit, but the other set of bayonet lugs, instead of being fixed to the camera body, is on a ring which rotates relative to the camera body. In this case, the detachable unit is not twisted or turned relative to the camera body when attaching or detaching it, but is simply moved axially toward or away from the camera body, without any turning. The attachment or detachment is performed by rotating the ring on the camera body which carries the bayonet lugs. In connection with Figs. 8–19 of the drawings of the present application, there will be described below certain embodiments of the invention which are particularly suited for use with this second stayle of bayonet connecting means.

According to one of the aspects of the present invention, the exposure value of the optical unit is set by means of a follow-up pointer which is moved to a position corresponding to the indication given by an associated pointer of a photoelectric exposure meter, thus avoiding all mental calculations relating to the exposure value setting, and avoiding the need for translating the indication of the exposure meter to a numerical value and then using this same numerical value again in setting the exposure adjustment, thereby providing a very simple setting means which can be operated quickly by an inexperienced amateur who knows little or nothing about photographic theory. When the shutter speed control member, or the diaphragm aperture control member, or both, are located in an interchangeable optical unit, as in the present instance, then it is highly desirable that a maximum number of the exposure value setting parts be placed on the camera body, and a minimum number be placed on the interchangeable unit, so that the same parts mounted on the camera body may be used with a number of different interchangeable units thus reducing the expense. This is accomplished by the present invention. Applicant has previously disclosed, in his copending application Serial No. 566,804, filed February 21, 1956, certain forms of setting mechanism for setting an exposure value in accordance with a follow-up pointer mounted on the camera body, but the constructions disclosed in the present application may be regarded as improvements upon the invention disclosed in the copending application just mentioned, and may also be regarded as improvements upon the constructions disclosed in applicant's copending application Serial No. 710,712, filed January 21, 1958, and disclosed in the above mentioned copending application of the present applicant and Franz Singer, Serial No. 707,796, filed January 8, 1958. Thus according to the present invention, the exposure value setting means includes, in each of the interchangeable optical units, the differential gearing shown in Fig. 2, but the follow-up pointer and the photoelectric exposure meter itself are provided on the camera body rather than on each separate interchangeable unit, and the connecting means are so arranged that any one of several interchangeable optical units may be quickly and properly connected in operative condition to the follow-up pointer on the camera body.

Figure 1A:
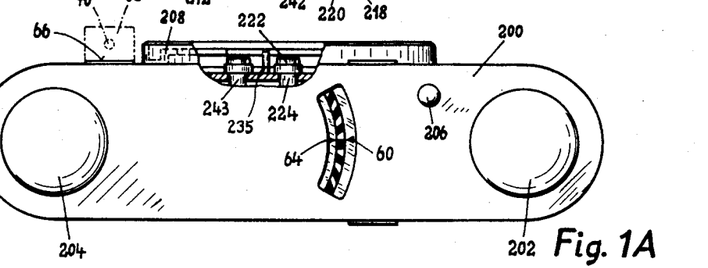
Fig. 1A is a top plan view of a camera to which the interchangeable unit of Fig. 1 is adapted to be applied, showing it detached from the optical unit.
Figure 3:
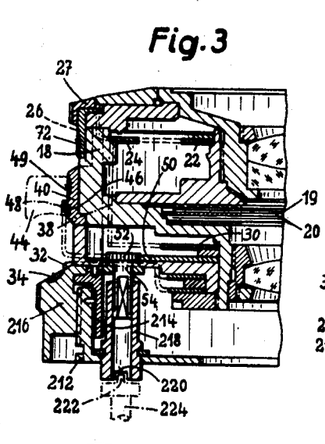
Fig. 3 is a fragmentary radial section through a portion of the optical unit, illustrating one form of the coupling means for coupling the exposure value setting parts on the optical unit to the exposure value setting parts on the camera body.
Figure 4:
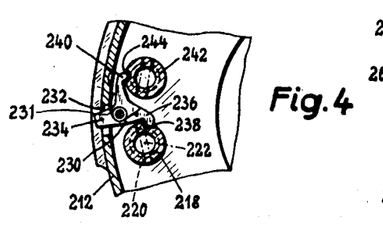
Fig. 4 is a transverse section through a fragment of the construction shown in Fig. 3, illustrating additional details.

Referring now to Figs. 3 and 4, the setting mechanism has already been described as far as the sleeve 218, which is rotatable but not axially movable in the bayonet mount 212 of the interchangeable unit. The parts 54 and 218 represent a telescopic drive which makes possible the axial displacement of the shutter 18 and the lenses, during focusing. The rear end of the sleeve 218 has a diametrical slot 220, into which fits a corresponding diametrical tooth or rib 222 at the forward end of a shaft 224 rotatably mounted in the camera body 200, the axis of the shaft being parallel to but offset from the optical axis. This shaft 224 forms the final member of that portion of the kinematic chain or driving connections which are mounted on the camera body. It is operatively connected by any suitable gearing of known form (not shown) to the follow-up mark or pointer 60 (Fig. 1A) of a ring rotatable in the camera body 200 and visible through an observation window in the top wall of the camera body. The connection between the shaft 224 and the follow-up pointer 60 may be, for example, in the same form illustrated as connecting the shaft 54 to the pointer 60 in Fig. 1 of the drawings of said copending application Serial No. 707,796, filed January 8, 1958.

Associated with this follow-up pointer 60 and preferably turning concentrically therewith, is the pointer 64 of a photoelectric exposure meter 66 installed in the front wall of the camera to receive light from the object or scene to be photographed, the exposure meter being shiftable from dim light to bright light conditions, and vice versa, by opening or closing a hinge flap 68 containing a small aperture 70 which admits a restricted amount of light to the photoelectric cell when the flap is in closed position. In order to adapt the linearity of movement of the follow-up pointer 60 to the non-linearity of movement of the exposure meter pointer 64, particularly at the end portions of the scale, any known means may be used such as the distorted connecting lines shown in Fig. 1A and also shown in greater detail in Fig. 6 of the drawings of applicant's said copending application Serial No. 566,804.

When the interchangeable unit is mounted in proper position on the camera, it is seen that the kinematic chain of connections is complete, between the adjusting ring 40 on the interchangeable unit and the follow-up pointer 60 on the camera body. By grasping the finger piece 44 and turning the ring 40 in one direction or the other, the operator is able to move the follow-up pointer 60 until it comes to the desired position with respect to the exposure meter pointer 64. As more fully explained in said copending application Serial No. 707,796, filed January 8, 1958, this turning of the ring 40 will change the diaphragm aperture without changing the shutter speed for which the unit was previously set, thus setting the parts to the desired exposure value. If the operator now wants a different shutter speed or a different diaphragm aperture, he can grasp the shutter speed adjusting ring 27 and turn it to set the parts at any desired coordinate pair of shutter speed and diaphragm aperture settings, without altering the exposure value. If it is shutter speed which is most important at the moment, the operator will turn the ring 27 to select the desired shutter speed, letting the diaphragm aperture fall where it may. If it is depth of field which is most important at the moment, the operator will watch the depth of field pointers 32 while turning the ring 27, and will adjust the ring 27 until the obtains the desired depth of field as disclosed by the pointers 32, letting the shutter speed itself come where it may.

In order that the coupling connections 220, 222 may only be disconnected when in a given operating position of the exposure value setting means, there is preferably provided a visual signal to indicate when the slot 220 and tongue 222 extend in a disconnectable position, that is, in a position substantially tangential to the optical axis and the exposure aperture. Such a tangential position will, of course, permit the necessary rotary movement of the interchangeable unit, for disconnecting or connecting the bayonet connection parts 208, 212. To give this indication, there may be a mark 226 (Fig. 1) on the exterior of the ring 40, and a mark 228 on a stationary part of the shutter housing 18. When the ring 40 is turned to a position to bring the mark 226 opposite the index mark 228, then (provided the film speed adjustment 46—49 is set to a predetermined base or standard setting) the slot 220 in the sleeve 218 will be in the desired tangential position, and the interchangeable unit can be disconnected. When the slot 220 is in a position other than the tangential position, the engagement of the parts 220 and 222 will prevent the interchangeable unit from being turned or twisted in the manner which is necessary to disconnect it from the camera body.

When the shutter is, as is preferably the case, of the type which is cocked or tensioned by movement of the film feeding knob 202 on the camera body, and which is released for making an exposure by movement of the "body release" member 206 on the camera body, then of course there must be another kinematic connection between the camera body and the interchangeable unit, for tensioning and releasing the shutter, in addition to the kinematic connection 220, 222 which forms part of the exposure value setting means. In some cases this kinematic connection for tensioning and releasing the shutter may comprise two separate shafts both parallel to and offset from the optical axis, one shaft being for tensioning the shutter and the other for releasing or tripping it, as shown for example in Figs. 2 and 3 of applicant's copending application Serial No. 514,218, filed June 9, 1955, (now Patent 2,900,885, granted August 25, 1959). In other instances, a single shaft may be used, rotatable in one direction for tensioning the shutter and then rotatable in the opposite direction for releasing or tripping the shutter to make an exposure, as shown for example in Figs. 7–15 of the last mentioned copending application, Serial No. 514,218. It is immaterial for purposes of the present invention how the shutter is tensioned or how it is released to make an exposure. But in any event, if there are shafts extending from the camera body to the interchangeable unit, the connection between the shutter operating shaft in the camera body and the alined shutter operating shaft in the interchangeable unit can be by means of a diametrical slot in one and a diametrical tongue or rib on the other, like the slot 220 and tongue 222 in Fig. 3, so that when the slot and tongue are turned to a tangential position there will be no interference with removal of the interchangeable unit from the camera.

To prevent accidental turning, while the interchangeable unit is disconnected from the camera, of the sleeve or hollow shaft 218 (and likewise to prevent such turning of any shutter tensioning and release shaft) in a manner which might interfere with replacement of the interchangeable unit on the camera, the interchangeable unit is provided with a locking bolt 230 (Fig. 4) in the form of a three-armed lever rotatable on a pivot parallel to the optical axis. A light spring 231 tends to turn the locking member 230 clockwise on its pivot. The first arm 234 of the locking member extends approximately radially outwardly through a slot 232 in the side wall of the bayonet mount member 212 of the interchangeable unit, in position to be engaged by a pin 235 (Fig. 1A) mounted in stationary position on the camera body, when the interchangeable unit is being turned or twisted toward its fully seated or engaged position on the camera. The second arm 236 of the locking member extends into the vicinity of the sleeve 218 and, when the unit is removed from the camera, engages in a locking notch 238 on the periphery of the sleeve 218. A third arm 240 of the locking member extends to the vicinity of the drive shaft 242 of the shutter (that is, the shaft the rotation of which tensions and releases the shutter, as above explained) and, when the unit is removed from the camera, engages in a locking notch 244 of this shaft 242.

When the two shafts 218 and 242 are in the tangential positions above mentioned, the respective locking notches 238 and 244 are in the proper positions to receive the locking ends of the arms 236 and 240 on the locking member 230. As the interchangeable unit is twisted in a removing direction, the arm 234 moves away from the fixed pin 235 on the camera body, so that the spring 231 turns the locking member 230 to lock the shafts 218 and 242, which remain locked against rotation so long as the interchangeable unit remains separate from the camera. When the interchangeable unit is mounted once more on the camera, the final part of the twisting motion carries the arm 234 into contact with the pin 235, so that the pressure of the latter swings the member 230 to an unlocking position against the force of its spring 231.

A similar lock arrangement, like the locking member 230 but pivotally mounted in the camera body rather than in the interchangeable unit, is preferably employed for locking the two shafts 224 and 243 in the camera body against turning movement when the interchangeable unit is removed. This locking member 230a in the camera body has an operating arm or tail 234a which is moved by a pin 235a fixed to the interchangeable unit, during the twisting motion to fasten or unfasten it, just as the locking lever 230 on the interchangeable unit is moved during twisting or untwisting by a fixed pin on the camera body. The arms 236a and 240a on the member 230a engage in locking notches 238a and 244a, respectively, in the shafts 224 and 243, respectively, under the influence of a spring 231a.

The bayonet connection lugs on the parts 208 and 212 are preferably so constructed that they are not entirely symmetrical, but can be engaged with each other only in one particular position of orientation, which will bring the shafts 218 and 242 to the proper position when the turning engaging motion is completed. Alternatively, if it is not desired to make the bayonet parts non-symmetrical, then a colored dot, for example, may be placed on the interchangeable unit and a corresponding colored dot on the camera body, to indicate the relative position of orientation in which the interchangeable unit should be engaged with the camera.

During its range of travel from extreme position to the other, the pinion 52 and shafts 54 and 218 make a plurality of complete revolutions. Therefore, instead of having a particular visual signal (226, 228) to indicate a particular exposure value setting for engaging or disengaging the interchangeable unit, it is possible so to design and proportion the exposure value setting means that at each of the extreme end positions or limit positions of movement of the ring 40 in one direction or the other, the pinion 52 and shafts 54 and 218 will be in the tangential position for engagement or disengagement, provided the film speed adjustment 46—49 is set in a predetermined standard position or base position. This will avoid the need for the special marking 226, 228, and the operator can then place the exposure value adjusting ring 40 in either one of its extreme positions, at one end or the other of its range of travel, in order to orient the shaft 218 properly for removing or replacing the interchangeable optical unit.

Figures 4, 4A, 6, 7:
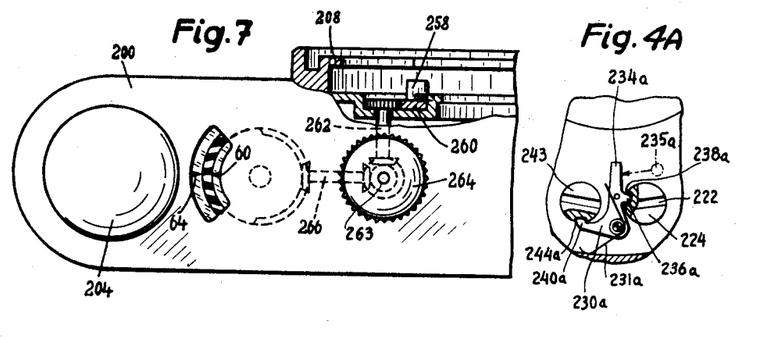
Fig. 4A is a view similar to Fig. 4, illustrating additional details.
Fig. 6 is a transverse section through a fragment of the construction shown in Fig. 5, illustrating additional details.
Fig. 7 is a view similar to a portion of Fig. 1A, illustrating further features of the embodiment shown in Figs. 5 and 6.
Figures 4A, 7:
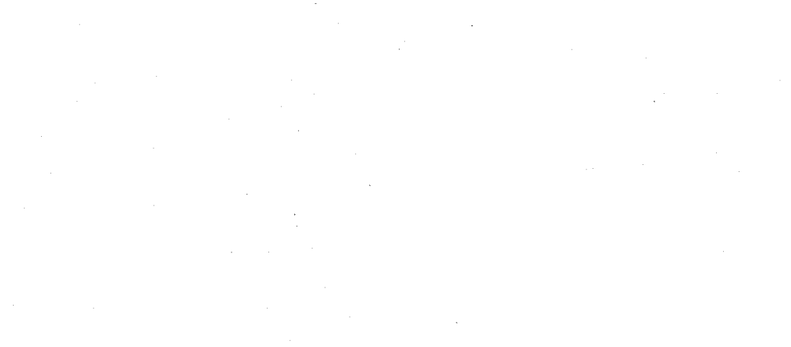
Figure 5:
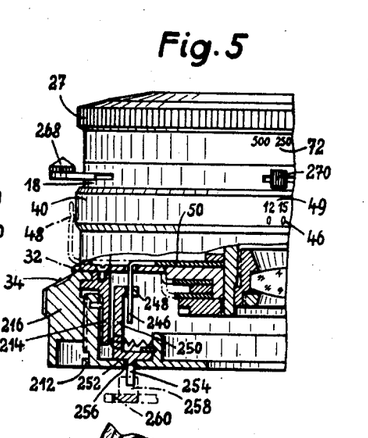
Fig. 5 is a view similar in general to Fig. 3, showing a modified construction of the means for coupling the adjusting parts in the detachable optical unit to the adjusting parts in the camera body.
Figure 6:
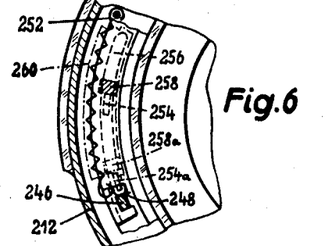

A modified form of the invention is disclosed in Figs. 5 to 7. The construction is the same as previously described except for the differences now to be pointed out.

The ring 50, instead of having peripheral gear teeth engaging a pinion 52 as was done in the previous embodiment, is now formed with an axially extending arm 246 which engages in a driving slot 248 of a segmental ring 250 which moves circumferentially in the mounting member 212 of the interchangeable unit, concentrically with the optical axis. A spring 252, constantly urges the segment 250 in a clockwise direction when viewed as in Fig. 6. An axially projecting lug 254 on the ring 250 extends out through an arcuate slot 256 at the rear of the bayonet mount 212. When the interchangeable unit is in place on the camera, this lug 254 lies against a forwardly projecting lug 258 on a ring 260 which is supported on the camera body for rotation about the optical axis as a center.

The ring 260 has gear teeth on its periphery, engaging a pinion at the forward end of a shaft 262, which shaft has at its rear end a bevel gear meshing with a bevel gear on a vertical shaft 263, the upper end of which carries an actuating knob 264 accessible on the top wall of the camera body 200. This setting knob 264 is provided with a latch which locks the knob against rotation except when the latch is released, as for example by pressing downwardly on the knob. The same or a different bevel gear on the shaft 263 meshes with a bevel gear on a horizontal shaft 266 in the camera body, which shaft carries another bevel gear meshing with the rotatable ring which carries the follow-up pointer 60. The follow-up pointer 60 is essentially the same as the follow-up pointer 60 in Fig. 1A and similarly cooperates with the pointer 64 of the photoelectric exposure meter.

When the setting knob 264 on the camera body is turned, the shaft 266 causes movement of the follow-up pointer 60 and the shaft 262 causes simultaneous movement of the ring 260. If the ring is turned in a counterclockwise direction when viewed as in Fig. 6, the lug 258 thereon presses against the lug 254 of the segment 250 and moves this segment correspondingly in a counterclockwise direction, thus moving the ring 50 of the interchangeable unit and adjusting the exposure value. If the knob 264 is turned in a direction to move the ring 260 in a clockwise direction when viewed as in Fig. 6, then the lug 258 tends to move away from the lug 254, and the spring 252 pulls the segment 250 in a clockwise direction, always keeping the lug 254 tight against the lug 258. Thus the ring 50 is moved to a position corresponding to the position of the follow-up pointer 60.

In this form of the invention, the interchangeable unit is to be disengaged from the camera body by a twisting movement in a counterclockwise direction as viewed as in Fig. 6, and is to be engaged by a twisting movement in a clockwise direction when viewed as in the same figure. The extent of twist necessary to engage or disengage the interchangeable optical unit is preferably greater than the entire angular travel of the ring 260 and lug 258. Therefore, no matter in what position the ring 260 and lug 258 are set at the time that the interchangeable unit is to be disconnected, the counterclockwise twisting for disconnection will cause the spring 252 to bring the segment 250 completely to the clockwise end of its range of travel, with the lug 254 up against the end of its slot 256. The latter part of the untwisting movement will separate the lug 254 slightly from the lug 258, and when the twisting is completed the interchangeable unit is moved axially away from the camera body in the usual manner. To replace the interchangeable unit on the camera body, a reverse procedure is employed, first moving the interchangeable unit axially toward the camera body, in the appropriate position in which the lug 254 always lies spaced in a counterclockwise direction from the lug 258. Then as the interchangeable unit is turned or twisted in a clockwise direction relative to the camera body, the lug 254 will automatically be brought up against the lug 258 and, during the further twisting movement, the spring 252 will stretch to whatever extent is necessary, depending on the position of the lug 258. Thus the interchangeable unit, when replaced on the camera body, will always and automatically be brought to the exposure value setting corresponding to the position of the lug 258 on the camera body, regardless of the position of this lug and regardless of the fact that the exposure value setting of the parts on the camera body may have been changed while the interchangeable unit was detached from the camera body. The exposure value of the interchangeable unit will be set, upon replacement, to the new value of exposure value setting. With this arrangement, it is not necessary that the exposure value be set to any particular amount or position, before detaching or attaching the interchangeable unit.

In this embodiment, as in all other embodiments of the invention, springs or other suitable means are employed for taking up play or backlash in the various moving parts.

Fig. 5 also illustrates another possible variation, in that the shutter is tensioned and released by manually operable members mounted on the shutter itself, rather than by members operated from the camera body. This is not necessarily the case, since the exposure value setting means is not dependent upon the particular form of mechanism used for tensioning the shutter or for releasing it. But simply to illustrate the different possibilities, the shutter shown in Fig. 5 has a manually operable tensioning arm 268 and a release member or trigger 270, which may correspond, for example, to the tensioning arm 6 and the trigger 101 in said Deckel and Geiger Patent 1,687,123. Of course the exposure value setting arrangement of Figs. 5–7 could also be used with a shutter which is tensioned and released from the camera body, as in Figs. 1–4.

It is now seen that both in the arrangement of Figs. 1–4 and in the arrangement of Figs. 5–7, the exposure value of the interchangeable unit is set by reference to a follow-up pointer mounted on the camera body. It is also seen that, at least in the broader aspects of the invention, it is immaterial whether the setting is accomplished by manual pressure applied to a member which is on the interchangeable unit (e.g., the finger piece 44 in Fig. 1) or by manual pressure applied to a member which is on the camera body (e.g., the knob 264 in Fig. 7). The finger piece 44 could be eliminated from the construction shown in Fig. 1, and a knob could be provided on the camera body, operatively connected to the follow-up pointer 60 just as the knob 264 is connected in Fig. 7. Or in the embodiment of Figs. 5–7, the knob 264 could be eliminated and a finger piece could be attached to the ring 40 on the interchangeable unit. If this last mentioned variation is used, it would be desirable to reverse the spring arrangement of the exposure value setting means, so that the ring 260 on the camera body is spring loaded, rather than the segment 250 on the interchangeable unit. However, this reversal is not preferred, because when the interchangeable unit is taken off the camera, the spring operating on the ring 260 would move the follow-up pointer 60 to one end of its range of travel, and the exposure value indication on the camera body would then have to be reset each time that an interchangeable unit is placed on the camera. With the preferred arrangement as first described in connection with Figs. 5–7, the exposure value parts on the camera body remain at the previously selected exposure value setting when the interchangeable unit is taken off, so that if it is desired to change from one interchangeable unit to another with considerable speed, this can be done without requiring a new setting of the exposure value.

Figure 8:
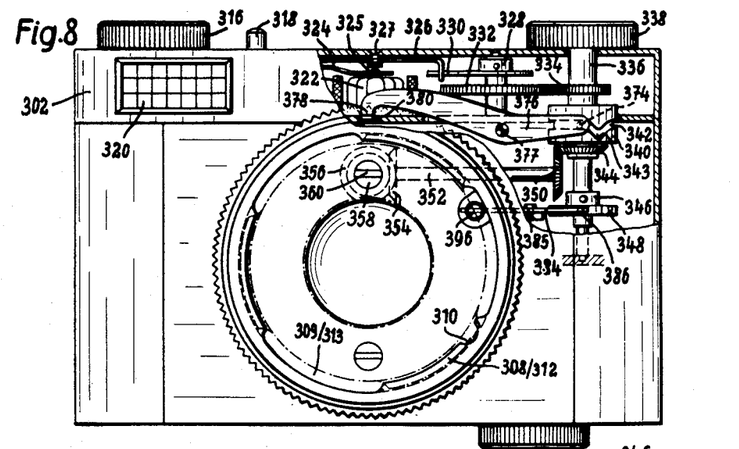
Fig. 8 is a front elevation of a camera in accordance with a third embodiment of the invention, with parts broken away to show the interior construction.
Figures 9, 18, 19:
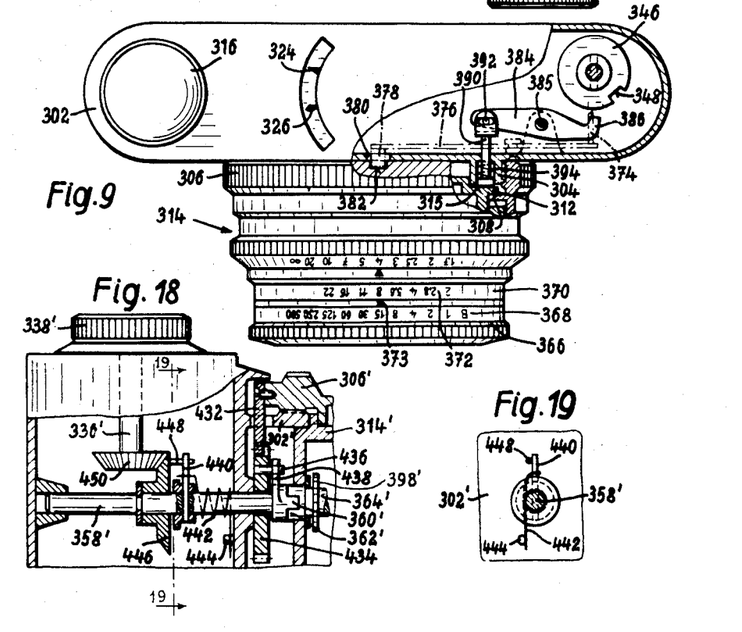
Fig. 9 is a top plan of the camera shown in Fig. 8, with parts broken away to show the interior construction.
Fig. 18 is a fragmentary view partly in elevation and partly in vertical section, through a portion of the camera and the detachable optical unit positioned thereon, illustrating still another modification or embodiment of the invention.
Fig. 19 is a fragmentary section taken approximately on the line 19—19 of Fig. 18.

Referring now to Figs. 8 and 9, there is illustrated a third embodiment of the invention which, as already indicated, is suitable for use with an interchangeable unit connected to the camera by a bayonet joint of the type in which there is no turning or twisting of the interchangeable unit relaitve to the camera body during the engagement or disengagement of the unit, the turning of the bayonet lugs being accomplished by turning a separate bayonet ring or locking ring mounted on the camera body.

The camera body is here shown at 302, and except for the features specifically mentioned below, the body as well as the interchangeable unit may be similar to those previously mentioned. The front wall of the camera is provided with a forwardly extending annular flange 304 concentric with the optical axis and externally threaded to receive an internally threaded collar ring or bayonet ring 306 which is screwed onto the flange 304 and which has three bayonet lugs 308 extending radially inwardly near the forward end of the ring 306. These bayonet lugs 308 are preferably spaced symmetrically, 120 degrees apart, and have three symmetrically arranged bayonet openings 309 between them. In one of the bayonet flanges 308 there is a round recess 310. The bayonet flange containing this round recess is thus narrower than the other two, and prevents incorrect attachment of the interchangeable optical unit 314 in a wrong position of orientation.

The interchangeable unit 314 has three bayonet flanges 312 having spaces 313 between them. The interchangeable unit, carrying the shutter (including adjustable iris diaphragm) and the lens, is moved axially toward the camera body in such position that the bayonet flanges 312 of the interchangeable unit pass through the openings or notches 309 of the locking ring 306, and the openings 313 of the interchangeable unit receive the bayonet flanges 308 of the ring 306. Then the ring 306 is turned, to bring the flanges on the ring in overlying relation to the flanges on the interchangeable unit (which does not turn) and to pull the bayonet flanges of the latter rearwardly toward the front of the camera, into firmly locked position. The unit is held in fastened position by any suitable fastening means of known form, such as a latch to prevent accidental loosening rotation of the collar ring or bayonet nut 306.

When the interchangeable unit is to be removed and replaced by another unit, the ring 306 is turned in the opposite direction until it comes into contact with a limiting stop (not shown) so that the overlying flanges of the ring 306 are brought opposite the notches of the interchangeable unit, without turning the latter. Then the interchangeable unit can be moved axially forwardly away from the camera.

This interchangeable unit contains a shutter speed setting ring, a diaphragm aperture setting member, and other parts the same as or similar to those in connection with the previous embodiments illustrated in this present application. Preferably also it has depth of field indicating pointers sweeping over the focus distance scale, in the manner previously described. But if the depth of field indicating pointers are eliminated, then a diaphragm aperture scale is preferably provided as shown at 372, marked on the diaphragm aperture ring 370 which rotates on the periphery of the fixed part of the interchangeable unit and which is read in conjunction with a reference point 373 on the fixed part of the casing. (The word "fixed" is here used in the sense of non-rotating; it does not imply that the part in question is fixed in an axial direction, for these parts may move axially when focusing.) The shutter speed adjusting ring 366 at the front of the interchangeable unit is also provided with a shutter speed scale 368 which is read in conjunction with the same fixed reference mark 373.

The shutter is cocked or tensioned in known manner by the operation of a film winding knob 316 on the camera body, and the shutter is released for making an exposure by depressing a release pin or plunger 318 also on the camera body, the tensioning and release of the shutter being accomplished through one or more kinematic chains such as those shown in copending application Ser. No. 514,218 already mentioned above. A photoelectric cell 320 is mounted on the camera body and is operatively connected by a suitable electric circuit with the moving coil 322 of the exposure meter, which has a pointer 324 visible through a window in the top wall of the camera body. The moving coil 322 moves on an axis 325, within a magnetic field, in the familiar manner of an exposure meter.

A follow-up pointer 326 is rotatable in the shutter housing on a pivot 327 coaxially with the axis 325 of the exposure meter pointer 324. The follow-up pointer is visible through the same window through which the exposure meter pointer is visible, and a downturned arm on the follow-up pointer engages the periphery of an equalizing cam 330 which is secured to a vertical shaft 328 which also has fixed to it a spur gear 332 meshing with a gear 334 fixed to a vertical shaft 336 which carries a setting knob 338 accessible at the top of the camera body.

The knob shaft 336 also carries a collar 340 having a box cam groove 342 therein, having at one point of the groove a curve 343. The shaft 336 also carries a bevel gear 344, and a second collar 346 having a notch 348 therein. On a shaft 352 rotatably supported in the camera housing at right angles to the shaft 336, there is a bevel gear 350 meshing with the gear 344, and at the other end of the shaft 352 another bevel gear 354 meshing with a bevel gear 356 at the rear end of the coupling shaft 358 of the exposure value setting mechanism within the camera body. The front end of this shaft 358 has a diametrical tongue or tooth 360 to engage in a diametrical slot in the rear end of the exposure value setting shaft of the interchangeable unit. This setting shaft in the unit is indicated at 364 in Figs. 10 and 11, and the diametrical slot thereof is shown at 362. This shaft corresponds to the shaft 218 and diametrical slot 220 of the embodiment described in connection with Fig. 3, and serves the same function, being operatively connected to the exposure value mechanism within the interchangeable unit. Thus the rotation of the shaft 358 caused by turning the knob 338 serves to turn the shaft 364 in the interchangeable unit and to adjust the shutter speed setting ring 366 and diaphragm aperture setting ring 370 of the interchangeable unit for the particular exposure value desired, the setting thereof preferably being accomplished by differential gearing of the kind shown in Fig. 2. The knob 338 is turned until the follow-up pointer 326 is brought to the desired position in alinement with the pointer 324 of the exposure meter, and this automatically sets the exposure value of the mechanism within the interchangeable unit, through the train of connections above described. It is not necessary, in this particular arrangement, to use the distorted lines for showing the relationship of the follow-up pointer to the exposure meter pointer, because the non-linearity can be accommodated by the shape of the cam 339.

Engaging in the cam groove 342 of the collar 340 is a pin 374 fastened to one end of a locking lever 376, the other end of which swings on the pivot pin 377 in the camera body and has a nose 378 which extends through a hole 380 in the camera body, and drops into a groove 382 milled in the collar ring 306. In most positions of the knob 338 and collar 340, the nose 378 of the lever is in locking position with respect to the collar 306, preventing any turning of the latter. But when the knob 338 is turned to a position where the pin 374 lies in the curved portion 343 of the cam groove 342, the nose 378 of the lever 376 is raised out of the hole 380, and the bayonet collar ring 306 is free to turn.

A second locking lever 384 swings on a pivot 385 in the shutter housing. A nose 386 at one end of this lever may enter a locking notch 348 in the disk 346, when this notch is opposite the end of the lever 384. The other end of the lever is pinned at 392 to the rear end of a bolt or plunger member 390 movable in a direction parallel to the optical axis and urged forwardly by a spring 394, so that the front end of the bolt member 390 normally lies against a stop surface 315 at the rear of the interchangeable unit. The disks 340 and 346 are so related that when the curve 343 of the disk 340 is in position opposite the pin 374, the notch 348 of the disk 346 is opposite the nose 386 of the lever 384. Therefore, when the knob 338 is brought to this predetermined position to release the nose 378 of the lever 376 from the bayonet nut 306, so that the latter can be turned to release the interchangeable unit for removal, the forward axial movement of the interchangeable unit allows the spring 394 to move the bolt 390 forwardly and to carry the nose 386 of the lever 384 rearwardly into the notch 348 of the disk 346, thereby locking the knob 338 against rotation until the interchangeable unit (or another one) is replaced on the camera body. During replacement, the rearward axial movement of the interchangeable unit will move the member 390 rearwardly against the force of the spring 394, which will release the locking nose 386 from the notch 348 so that the knob 338 can again be turned after the interchangeable unit is properly replaced on the camera body. As soon as the knob 338 is turned from the locking position, the cam groove 340 will cause the locking nose 378 to enter the notch 382 in the bayonet ring 306 so that the ring is now held in its locked position.

Figure 10:
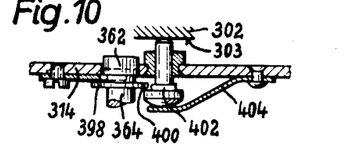
Fig. 10 is a fragmentary horizontal section through certain parts of the embodiment shown in Figs. 8 and 9, illustrating additional details.
Figure 11:
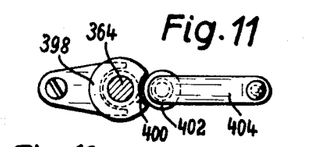
Fig. 11 is an elevation or face view of some of the parts shown in Fig. 10.

This mechanism as above described serves to lock the parts of the exposure value setting mechanism which are mounted on the camera, in a predetermined position when the interchangeable optical unit is removed. It is desirable also to lock the exposure value setting parts within the interchangeable unit in a predetermined position and keep them in such position so long as the unit remains removed from the camera body. A simple form of mechanism for locking the parts in the interchangeable unit is shown in Figs. 10 and 11. The shaft 364, which is rotated in accordance with changes in the exposure value setting, carries a collar 398 which has a round recess or notch 400 in its periphery. Mounted in the interchangeable unit is a plunger pin or locking pin 402, the head of which corresponds approximately to the shape of the notch 400. A leaf spring 404 fastened to the interchangeable unit tends to move the locking pin 402 rearwardly, but when the interchangeable unit is in normal position mounted on the camera body, such rearward movement is prevented by contact of the rear end of the pin 402 with a surface 303 on the camera body. This holds the head of the pin 402 out of the plane of the notched disk 398, so that the shaft 364 is free to turn.

The parts are so proportioned and designed that when the knob 338 on the camera body is in the position for unlocking the bayonet nut 306 so that the interchangeable unit can be removed, the shafts 358 and 364 are also turned to the position in which the notch 400 is in line with the head of the locking pin 402 as seen in Fig. 11. Then when the interchangeable unit is released and is moved axially forwardly away from the camera body, the spring 404 will move the locking pin 402 rearwardly (since such rearward movement is no longer obstructed by contact with the camera body) and the head of the locking pin will enter the notch 400, thereby locking the shaft 364 against any rotation away from the predetermined set position which it occupied at the moment that the interchangeable unit was disconnected. Thus it is assured that when the interchangeable unit is again connected, the shaft 364 will be in proper relation to the shaft 358 of the camera body (which meanwhile has been locked by the locking of the knob 338) and the parts will fit together properly.

During removal of the interchangeable unit, the bayonet nut 306 must be moved to the fully released position up against its limiting stop as already mentioned. This brings the notch 310 thereof opposite the front end of the locking bolt 390, so that as the interchangeable unit is moved axially away from the camera body, the front end 396 of the locking bolt moves forwardly into the notch 310 of the member 306 and holds this member 306 in its fully released position, preventing any further rotation of the bayonet nut from the fully released position. As soon as the same or a different interchangeable unit is moved axially against the camera in proper position for reconnection, this moves the locking bolt 390 rearwardly so that the bayonet nut 306 is again free to turn.

Figure 12:
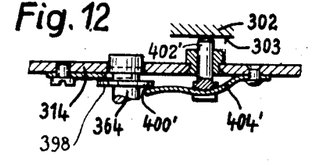
Fig. 12 is a view similar to Fig. 10, showing a modification of the construction.
Figure 13:
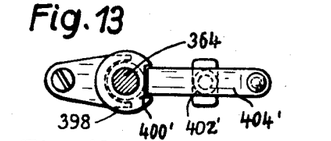
Fig. 13 is an elevation or face view of some of the parts shown in Fig. 12.

A variant form of locking means is shown in Figs. 12 and 13. It corresponds essentially to the form disclosed in Figs. 10 and 11, the difference being that instead of a separate locking plunger 402, the leaf spring 404' itself enters the locking notch 400' of the collar 398 on the shaft 364. The leaf spring is swung to its unlocking position by a plunger pin 402' which, as before, engages a surface 303 of the camera body when the interchangeable unit is mounted on the camera body, thereby moving the leaf spring 404' forwardly to unlock the shaft 364.

Figure 14:
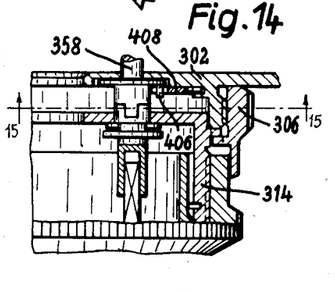
Fig. 14 is a fragmentary view partly in plan and partly in radial section taken approximately on the line 14—14 of Fig. 15, illustrating another modification of the same basic construction shown in Figs. 8 and 9.
Figure 15:
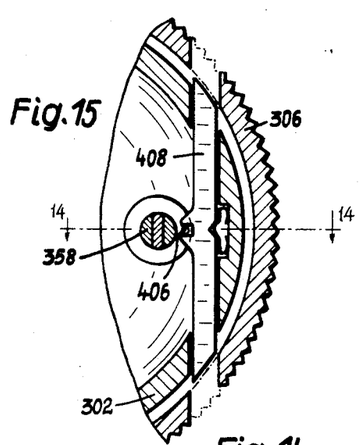
Fig. 15 is a vertical section taken approximately on the line 15—15 of Fig. 14.

An alternative locking device for the bayonet nut or collar ring 306 is illustrated in connection with Figs. 14 and 15. Instead of using the locking lever 346 controlled by the collar 340, there may be provided an eccentric pin 406 fastened to a collar on the shaft 358 within the shutter housing. This pin engages in a lateral notch in the locking slide 408 which, in a central position as shown in Fig. 14, has its ends lying inside the inner face of the ring 306, in non-blocking relation thereto. Thus in the predetermined position of rotation of the shaft 358 as indicated in Fig. 14, the collar 306 can turn. But when the shaft 358 is moved to any other position except this predetermined position, the pin 406 will move the locking slide 408 in one direction or the other so that one end or the other engages an alined opening in the collar 306 and prevents rotation thereof.

Figure 16:
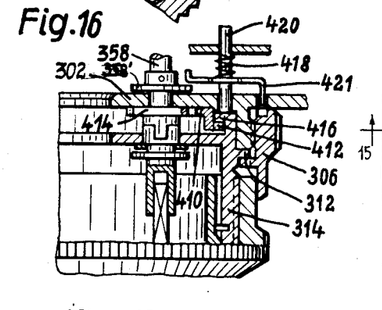
Fig. 16 is a view similar to Fig. 14 showing still another modification of the same basic construction shown in Figs. 8 and 9.
Figure 17:
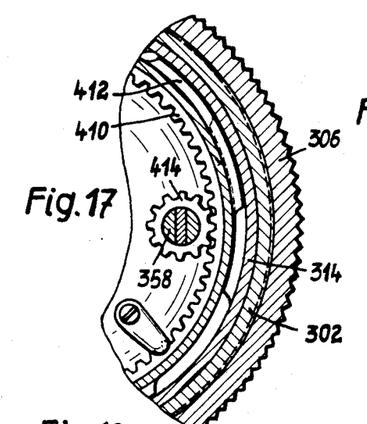
Fig. 17 is a vertical section through the construction shown in Fig. 16.

In the modification shown in Figs. 16 and 17, the collar 306 does not have any lock. There is, however, a second bayonet connection, which must be moved to enable disconnection of the interchangeable unit. A ring 410 is mounted on the camera body 302 for rotation about the optical axis, and is provided with bayonet lugs 412 which engage bayonet lugs 416 on the interchangeable unit. This bayonet lug arrangement is in addition to the bayonet lugs which engage those lugs of the ring 306. The bayonet ring 410 has internal gear teeth meshing with a pinion 414 fastened to the exposure value setting shaft 358. Thus it is only in a given operating position of the shaft 358 that the ring 410 is moved to a position where its bayonet lug 412 will release the bayonet lugs 416 of the interchangeable unit and permit removal of the interchangeable unit from the camera. In all other positions of orientation of the shaft 358, the bayonet lugs 412 will hold the interchangeable unit against removal. Of course the bayonet nut ring 306 must also be moved to its releasing position, up against its limiting stop in a releasing direction.

When the ring 306 reaches its fully releasing position, a notch in the rear edge thereof lies opposite the forward end of a blocking bolt member 421 secured to a shaft or pin 420 movably mounted in the camera body and pressed forwardly (in a direction parallel to the optical axis) by a pin 418. The front end of this pin normally engages the rear end of the interchangeable unit when the latter is in normal position on the camera body, so that the locking bolt 421 is held out of engagement with the ring 306. However, when the interchangeable unit is moved axially forwardly to remove it from the camera, the spring 418 then presses the pin 420 forwardly, carrying the blocking member 421 into the notch in the rear face of the nut ring member 306, and simultaneously carrying another part of the blocking member 421 into a notch on the collar 358a secured to the shaft 358, thus locking the latter against turning so long as there is no interchangeable unit in properly mounted position on the camera body.

Another embodiment of the invention is illustrated partially in Figs. 18 and 19. Except for the features mentioned below, the construction of both the camera and the interchangeable optical unit is the same as previously described in connection with the embodiment of Figs. 8 and 9. Many of the similar parts are indicated by the same reference numerals used in connection with the previous embodiment, with the addition of a prime, and little or no further description of such parts is needed.

The setting knob 338' on the camera body is connected, as before, to the follow-up pointer of the exposure meter. The shaft 336' of this knob is fixed to a bevel gear 450 which meshes with a bevel gear 446 which is not fixed to but is rotatable on the shaft 358', which shaft at its forward end has the diametrical lug or tooth 360' for engaging in the diametrical groove or slot 362' at the rear end of the exposure value setting shaft 364' of the interchangeable optical unit 314' when the latter is mounted in place on the camera body 302'. The interchangeable unit is detachably held on the camera body by the bayonet nut or clamping collar ring 306' which is like the previously described bayonet nut 306 except that the nut 306' has firmly fastened to it a gear segment 432 having internal teeth meshing with a gear 434 rotatable on the shaft 358'. A pin or lug 436 fixed to the gear 434 may engage one side of a radial arm 438 fixed to the shaft 358'.

For operatively coupling the shaft 358' to the bevel gear 446, the bevel gear carries a pin 448 fixed to it, which may engage one side of a radial arm 440 fixed to the shaft 358'. A spring 442 coiled around the shaft 358' has one end anchored by a pin 444 on a fixed part of the camera body 302', and its other end presses against the arm 440 in a direction tending to keep this arm in contact with the pin 448 on the bevel gear 446. This spring is fairly strong and has sufficient force to overcome the internal frictional resistance of the exposure value setting parts within the interchangeable optical unit 314', so that under normal operating conditions the spring 442 will turn the shafts 358' and 364' to whatever position (light value setting) is determined by the rotary position of the gear 446, which in turn is determined by the position of the knob 338'. This knob is provided with a latch for holding it immovably in any position in which it is set, until the latch is purposely released in order to set the knob to a new position. This latch (not shown) may be of any conventional known form, and may be released, e.g., by pressing the knob downwardly toward the camera body, or by pulling it upwardly away from the camera body, or by operating a separate finger piece mounted on the knob itself or mounted on the camera body near the knob. For purposes of the present invention it is entirely immaterial how the knob is latched, so long as there is some sort of releasable latch preventing the knob 338' from turning except when it is purposely desired to turn it to a new setting.

In the operation of this form of the invention, assuming that the interchangeable optical unit is correctly mounted in proper position on the camera body, the knob 338' is manually turned until the follow-up pointer 326 driven by the knob is in proper relation to the exposure meter pointer 324. This turning of the knob serves also to turn the gear 446. Under the influence of the spring 442, the shaft 358' turns with the gear 446, to whatever position is assumed by the gear at the conclusion of the adjusting motion of the knob 338'. Due to the tongue and slot connection 360', 362', the shaft 364' in the interchangeable unit 314' is turned to the corresponding position, thereby turning the gear 52 (Fig. 2) which is connected to this shaft 364', and turning the ring 50 and the ring 40 of the differential gear mechanism in the interchangeable unit, to set the inexchangeable unit to the desired exposure value. The exposure can now be made. Or if the photographer is not satisfied with the particular shutter speed or the particular diaphragm aperture or the depth of field for which the parts are now set, he can grasp the shutter speed setting ring (shown at 27 in Figs. 1 and 3, or at 366, Fig. 9) and turn it to select any other desired pair of coordinated values (shutter speed and diaphragm aperture) without altering the exposure value setting, since the planet gear 38 (Fig. 2) will turn the sun gears 24 and 30 through equal angles in opposite directions (so long as the rings 50 and 40 remain stationary) and will alter the diaphragm aperture setting by a complementary amount sufficient to compensate for the change in shutter speed setting.

Now if it is desired to remove the interchangeable optical unit (e.g., to replace it with another optical unit having a lens of different characteristics) this can be done while the knob 338' is in any position within its range of movement, and it is not necessary to shift the knob to a given or predetermined position in order to effect removal. The operator turns the retaining ring or bayonet nut member 306' in a releasing direction, i.e., in a counterclockwise direction when viewed from the front. This releases the bayonet lugs, and at the same time the rotation of the gear segment 432 turns the gear 434 in a counterclockwise direction. The pin 436 on the gear, acting on the arm 438, turns the shafts 358' and 364' counterclockwise against the force of the spring 442. This does not affect the position of the gear 446 or the knob 338', however, for the arm 440 on the shaft simply moves away from the pin 448 on the gear, leaving the gear where it was.

The parts are so proportioned that when the nut member 306' reaches its limit of motion in a releasing direction and comes up against its fixed stop (not shown) which determines its end position in this direction, the shafts 358' and 364' will have been turned always to a predetermined position (preferably the end position of the range of travel in this direction) and the locking notch 400 or 400' (Figs. 10-13) in the collar 398' (Fig. 18) on the shaft 364' will be opposite the locking member 402 or 404'. It does not matter which of the two forms of locking member is used at this point; it may be either a spring-pressed locking pin such as shown at 402 in Figs. 10 and 11, or a pin-operated locking spring, such as shown at 404' in Figs. 12 and 13. But one or another of these forms of locking mechanism (or equivalent) is used on the interchangeable optical unit of the embodiment referred to in Fig. 18, so that as the interchangeable unit is moved axially away from the camera body, the exposure value setting shaft 364' of this unit will be locked against rotation, in the predetermined position to which it was turned by the releasing movement of the bayonet nut member 306'. Also, through the axial separating movement of the interchangeable unit away from the camera body, another spring pressed locking device on the camera body serves to lock the bayonet nut member or clamping ring 306' in its fully released or limit position. This locking device for the member 306' is preferably of the form shown in Fig. 16, comprising the parts 418, 420, and 421, the latter entering a locking notch in the rear edge of the member 306'. The extension on the member 421 which directly locks the shaft 358 in the arrangement shown in Fig. 16 can be omitted when dealing with the embodiment referred to in Fig. 18, however, since the locking of the nut member 306' will serve, through the gears 432 and 434 and the pin 436, to maintain the shaft 358' in the desired predetermined position.

While the optical unit remains removed from the camera, the adjusting knob 338' may still be manipulated throughout its entire range, because the shaft 358' and arm 440 are held at the extreme end of their range of travel, and the pin 448 on the gear 446 does not come up against the arm 440 until it reaches the end of its range of travel in the corresponding direction.

When the interchangeable optical unit (or another one substituted for it) is applied to and mounted on the camera, the rotation of the bayonet clamping nut 306' in a clamping direction will turn the gear 434 in a clockwise direction when viewed from the front, thus allowing the spring 442 to turn the now recoupled shafts 358' and 364' in a clockwise direction until the arm 440 comes into contact with the pin 448 in whatever position the pin may happen to be, depending upon the position at this moment of the setting knob 338' and the follow-up pointer 326. Thus upon reattachment or remounting of the optical unit upon the camera body, the exposure value parts within the interchangeable unit are always and automatically reset to the exposure value then represented by the position of the manual setting knob on the camera body, notwithstanding the fact that the position of this knob may have been changed while the interchangeable unit was detached from the camera. In this respect, the embodiment of Fig. 18 is broadly similar to the embodiment described with reference to Figs. 5-7. Both in the construction described with reference to Fig. 18 and that described with reference to Figs. 5-7, the exposure value of the parts on the optical unit remains at one end or limit of the range so long as the optical unit remains detached from the camera, but the shutter speed setting and the diaphragm aperture setting can be altered to a complementary extent while the unit is detached, without changing the exposure value.

Like the construction of Figs. 5-7, the construction described with reference to Fig. 18 may be modified to be the converse of what has been described. That is, the spring-pressed coupling and other parts may be rearranged so that the follow-up pointer on the camera is automatically brought to one end of its range of travel when the interchangeable unit is detached, and is automatically reset, upon reattachment of the unit, to the exposure value position determined by the then-existing position of the manually operable adjusting member, regardless of whether this manually operable member is mounted on the interchangeable optical unit (e.g., the finger piece 44 in Figs. 1 and 3) or is mounted on the camera body (e.g., the knob 264 in Fig. 7, or knob 338 in Fig. 8, or knob 338' in Fig. 18).

It is seen from the foregoing disclosure that the above objects of the invention are well fulfilled. It is to be understood that the foregoing disclosure is given by way of illustrative example only, rather than by way of limitation, and that without departing from the invention, the details may be varied within the scope of the invention.

What is claimed is:

1. A photographic camera structure comprising a camera unit and an interchangeable optical unit detachably mounted in operative position on the camera unit, said structure including a shutter speed setting member and a diaphragm aperture setting member, at least one of which setting members is mounted on said optical unit and removable therewith from the camera unit, an exposure meter and a meter follow-up pointer both mounted on said camera unit and remaining thereon when said optical unit is detached from said camera unit, and disengageable connecting means for operatively connecting said follow-up pointer on said camera unit to a setting member on said optical unit to move therewith, said connecting means including a rotary member rotatable about an axis parallel to the optical axis of said camera unit, characterized by means rendered effective by relative movement between said camera unit and said optical unit in a disengaging direction, for maintaining said member of said connecting means in a predetermined angular position required for again mounting said optical unit in operative position on the camera unit.

2. A photographic camera structure comprising a camera unit and an interchangeable optical unit detachably mounted in operative position on the camera unit, said structure including a shutter speed setting member and a diaphragm aperture setting member both mounted on said optical unit, differential gearing also mounted on said optical unit for operatively connecting said two setting members to each other for conjoint complementary movement without changing the exposure value represented by the relative positions of the two setting members and for non-complementary movement to change said exposure value, and an exposure value indicating pointer mounted on said camera unit and remaining thereon when said optical unit is detached from said camera unit, characterized by a shaft rotatably mounted on said camera unit and operatively connected to said pointer, a second shaft rotatably mounted on said optical unit and operatively connected to said differential gearing, and disengageable connecting means for operatively connecting one of said shafts to the other of said shafts to turn therewith, said disengageable connecting means being disengaged by the act of detaching said optical unit from said camera unit and being automatically engaged by the act of mounting said optical unit in operative position on said camera unit.

3. A construction as defined in claim 2, further characterized by means rendered operative by the act of detaching said optical unit from said camera unit for holding at least one of said shafts in a predetermined position suitable for engagement of said disengageable connecting means when said optical unit is again mounted in operative position on said camera unit.

4. A construction as defined in claim 2 in which said units are so constructed that relative rotary movement between at least a part of said optical unit and at least a part of said camera unit is required for detaching said two units from each other, characterized by means rendered operative by said relative rotary movement for holding at least one of said shafts in a predetermined position during continuance of detachment of said two units from each other.

References Cited in the file of this patent

UNITED STATES PATENTS

| | | |
|---|---|---|
| 2,117,429 | Kuppenbender | May 17, 1938 |
| 2,186,616 | Mihalyi | Jan. 9, 1940 |
| 2,596,328 | Dorsey | May 13, 1952 |
| 2,830,513 | Sauer | Apr. 15, 1958 |

FOREIGN PATENTS

| | | |
|---|---|---|
| 1,120,299 | France | Apr. 16, 1956 |